Nov. 25, 1947.   H. V. SHARPE   2,431,588
TAIL GATE CONTROL DEVICE
Filed Jan. 22, 1946    2 Sheets-Sheet 1
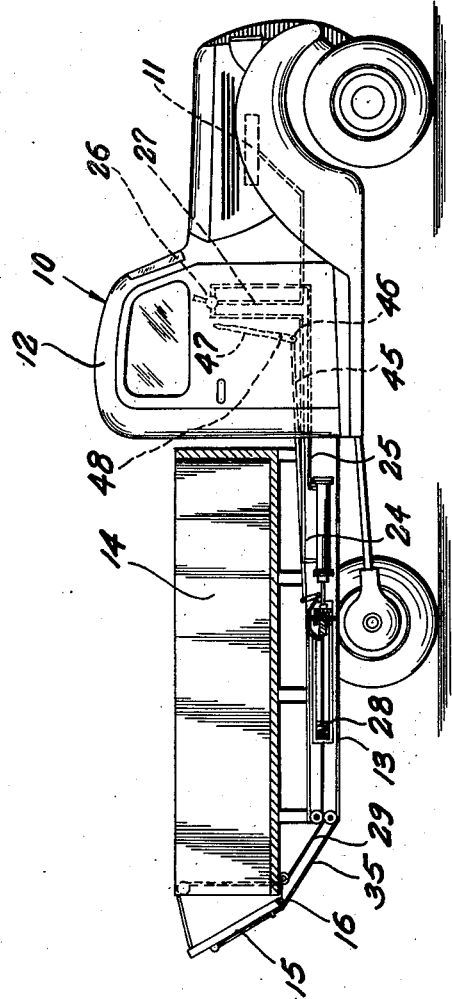
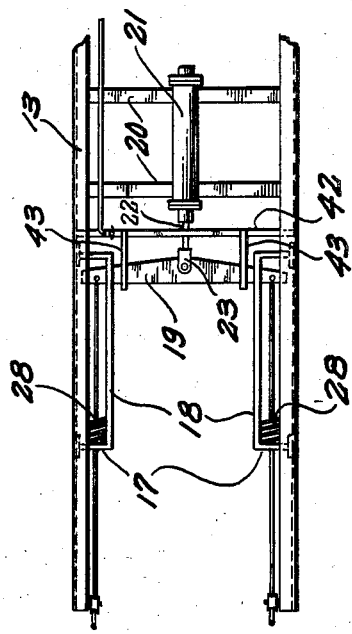
Inventor
Hermon V. Sharpe
By Clarence A. O'Brien
and Harvey B. Jacobson
Attorneys Nov. 25, 1947.  H. V. SHARPE  2,431,588
TAIL GATE CONTROL DEVICE
Filed Jan. 22, 1946   2 Sheets-Sheet 2
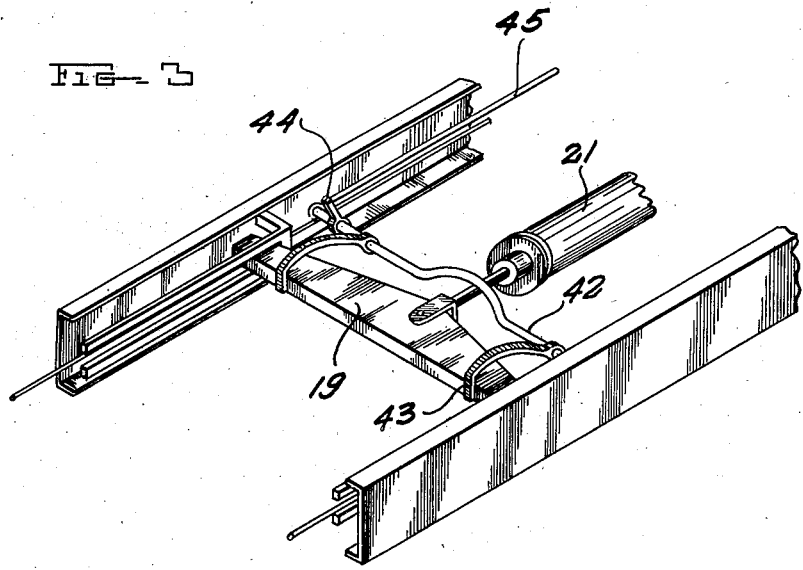
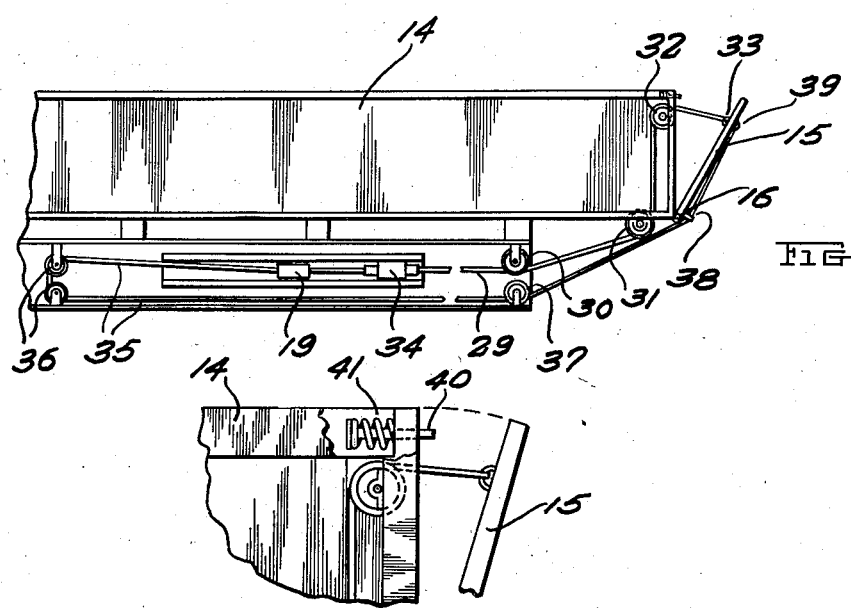
Inventor
Hermon V. Sharpe
By Clarence A. O'Brien
and Harvey B. Jacobson
Attorneys Patented Nov. 25, 1947

2,431,588

UNITED STATES PATENT OFFICE 2,431,588

TAIL GATE CONTROL DEVICE

Hermon V. Sharpe, Houston, Tex., assignor of one-half to Thomas A. Sharpe, Houston, Tex.

Application January 22, 1946, Serial No. 642,597

4 Claims. (Cl. 296—50)

1

This invention relates to a tail gate control device for use on trucks, vans, and similar self-propelled vehicles employed in hauling.

The primary object of the invention is to enable a truck or van driver to open or close the tail gate on his truck without leaving the driver's seat.

In the ordinary type of truck or van now commonly used it is necessary for the driver of the vehicle to stop when approaching a loading platform or dock and go back to the rear end of the truck or van and lower the tail gate by hand. This having been accomplished it is then necessary for the driver to return to the cab of the truck or van and back up to the loading platform or dock and having discharged the load or taken on another to pull away from the dock or loading platform stop the motor of his vehicle and repeat the operation of walking back to the tail gate to close and fasten the same. All of these operations not only inconvenience the driver of the vehicle but are time consuming and represent time lost on the delivery circuit.

Another object of the invention is to conserve the time of the truck driver and thus facilitate the rapid handling of the material being delivered.

Among its features my invention embodies a cross head mounted in the frame of a vehicle to move longitudinally beneath the body of the truck, a pulley on each side of the body near the free edge of the tail gate when the latter is in body-closing position, a cable attached to each end of the cross head, each cable being trained over the pulley on its respective side of the truck's body, means connecting each cable to the tail gate and power-actuated means controllable from the driver's seat or cab of the vehicle to move the cross head and cause the tail gate to swing into closed position.

Other features include means operable by the cross head to swing the tail gate to open position and means to initiate movement of the tail gate toward either open or closed position which means operates in conjunction with the power-actuated means in imparting motion to the tail gate.

In the drawings,

Figure 1 is a side view of a truck, part being broken away to more clearly illustrate the details in construction, Figure 2 is a horizontal fragmentary view of the truck chassis, Figure 3 is a fragmentary perspective view of the truck chassis, Figure 4 is a fragmentary enlarged view of the truck chassis and tail gate operating mechanism, and Figure 5 is a fragmentary view of the truck body and tail gate showing in detail the means for initiating movement of the tail gate toward open position.

Referring to the drawings in detail, a truck designated generally 10 is provided with the usual internal combustion engine having a conventional intake manifold 11. The cab 12 is positioned to the rear of the internal combustion engine in the conventional manner and mounted on the chassis 13 of the truck is a truck body 14 having an open rear end which is closed by a tail gate 15 hinged as at 16 to swing about a horizontal axis. Obviously other types of truck bodies may be employed, such as a van body having pivoted tail gate which may swing about horizontal or vertical axes as the case may be. In the case of a van body the tail gate operating pulleys to be more fully hereinafter described will be rearranged of course to meet the varying requirements but the principles of the invention hereinafter to be set forth remain the same irrespective of the type of body to which it is attached.

Attached to inwardly extending brackets 17 carried by opposite side rails of the chassis 13 are spaced guide bars 18 in which a cross-head 19 is adapted to slide longitudinally of the chassis 13. Mounted on suitable cross members 20 extending between the side rails of the chassis 13 is a prime-mover which in the present instance takes the form of a vacuum cylinder 21 in which a piston connected to a piston rod 22 is slidable. The outer end of the piston rod 22 is connected by means of a yoke 23 midway of the ends of the cross head 19. It will thus be seen that when the piston within the cylinder 21 is moved to advance or retract the piston rod 22 the cross head 19 will be moved in unison therewith. Connected to opposite ends of the cylinder 21 are vacuum lines 24 and 25 which lead forwardly beneath the body 14 and into the cab 12 and thence upwardly to opposite sides of a control valve 26 mounted within the cab 12 within convenient reach of the driver of the vehicle. This valve is connected through the medium of a suitable vacuum line 27 to the intake manifold 11 so that when the valve is moved to one position the air behind the piston within the cylinder 21 will be exhausted, thus causing the piston to move within the cylinder and advance or retract the cross head as the case may be. Attached to the brackets 17 at the ends of the guide bars 18 opposite the cylinder 21 are compression coil springs 28 which are adapted to be compressed by the cross head 19 when the tail gate 15 is lowered so as to initiate upward movement of the tail gate when the latter is to be closed as will be more fully hereinafter explained.

Connected to opposite ends of the cross-head 19 and extending rearwardly of the chassis 13 along opposite side rails thereof are cables 29 which are trained over guide pulleys 30 and 31 at the rear end of the body 14 and thence upwardly over pulleys 32 carried near the upper ends of the corner or end posts of the truck body. The ends of the cables 29 opposite those connected to the cross-head 19 are attached by suitable eye bolts 33 to the tail gate near its upper edge, and mounted in the cables at any suitable point between their connections with the cross-head and the tail gate are suitable turn buckles 34 by means of which adjustment of their respective cable lengths may be achieved. Extending forwardly from each end of the cross-head 19 are cables 35 which are carried over guide pulleys 36 and thence rearwardly along the side rails of the chassis 13 where these cables 35 are guided over guide pulleys 37. Leaving the guide pulleys 37 the cables 35 are directed through suitable eyes 38 carried by the tail gate to eye bolts 39 connected to the tail gate in substantial alignment with the eye bolts 33 previously referred to. It will thus be seen that when the cross-head moves in either direction the tail gate 15 will be moved in unison therewith.

In order to initiate lowering movement of the tail gate a plunger 40 is mounted on each side of the truck body 14 adjacent the upper edge of the tail gate 15 and surrounding said plunger is a suitable retractile coil spring 41 which is adapted to urge the plunger outwardly into the position illustrated in Figure 5 so that when the tail gate is moved into closed position the springs will be extended and will serve to initiate opening movement of the tail gate when the cross-head 19 is moved away from the cylinder 21.

In order to hold the tail gate in closed position without requiring the continuous evacuation of the cylinder 21 a suitable pivot rod 42 is pivotally supported in the chassis 13 near the end of the piston 21 through which the piston rod 22 operates. This pivot rod or shaft 42 carries a pair of rearwardly extending hooks 43 which are adapted when the cross head 19 is in retracted position as illustrated in Figures 2 and 5 to engage the cross head and hold it against movement. In so doing it will be obvious that the tail gate 15 will be held in closed position. In order to facilitate the manipulation of the hooks 43 a lever arm 44 is attached to the pivot rod 42 and the opposite end of this lever arm is pivotally connected to a forwardly extending pull rod 45, the forward end of which is pivoted as at 46 to a hand lever 47 which is pivoted at 48 so as to be within easy reach of the driver of the vehicle when he is occupying the cab 12.

In operation it will be understood that the driver of the vehicle may without leaving the cab 12 operate the hand lever 47 to release the hooks 43 and then by manipulating the valve 26 he may cause the cylinder to be evacuated through pipe 24 and thus move the cross head 19 toward the rear of the vehicle. In so doing pull will be exerted on the cable 35 so as to move the tail gate 15 into lowered position about its horizontal pivot 16. The lowering movement will be initiated by the action of the plungers 40 under the influence of their springs 41 and the driver of the vehicle may thus open the tail gate preparatory to loading or unloading the truck body 14 without having to leave the cab 12, and in fact while the vehicle is in motion. Having backed up to the dock and either discharged a load or having loaded it is only necessary for the driver to again manipulate the valve 26 to establish communication between the intake manifold 11 and the pipe 25 so as to cause the cross head 19 to move toward the forward end of the vehicle and exert pull on the cables 29. In so doing it will be obvious that the spring 28 will function to initiate the movement of the cross head and the tail gate 15 will be swung about its pivot 16 into closed position with the plungers 40 and their respective springs 41 serving as buffers to prevent too rapid a movement of the tail gate as it closes. Having closed the tail gate it is then only necessary to manipulate the lever 47 so as to cause the hooks 43 to engage the cross head 19 as illustrated in Figures 2 and 3 and upon discontinuing the evacuation of the cylinder 21 it will be obvious that the parts will be locked with the tail gate closed, and the latter cannot be opened until the lever 47 within the cab 12 has been moved by the operator. It will thus be seen that not only will the driver's time be saved but the annoyance of having to leave the cab and walk back to manipulate the tail gate is avoided. By locking the tail gate in closed position from the cab of the vehicle it is obvious that theft may also be frustrated as access to the load carried by the vehicle can be had only by manipulating the lever 47.

While in the foregoing there has been shown and described the preferred embodiment of this invention it is to be understood that minor changes in the details of construction, combination and arrangement of parts may be resorted to without departing from the spirit and scope of the invention as claimed.

Having thus described the invention, what is claimed as new is:

1. The combination with a vehicle having a body which is open at its rear end, a driver's seat at the forward end of the body and a tail gate mounted at the rear end of the body to swing about a horizontal axis and close at least a part of the open rear end of the body, a cross head mounted to move longitudinally beneath the body, a pulley on each side of the body near the free edge of the tail gate when the latter is in body closing position, a cable attached to each end of the cross head, each cable being trained over the pulley on its respective side of the body, means connecting each cable to the tail gate, power actuated means controllable from the driver's seat to move the cross head and cause the tail gate to swing about the horizontal axis into closed position, latching hooks for engaging the cross head and holding it in tail gate closing position, and means operable from the driver's seat for releasing the latching hooks.

2. The combination with a vehicle having a body which is open at its rear end, a driver's seat at the forward end of the body and a tail gate mounted at the rear end of the body to swing about a horizontal axis and close at least a part of the open rear end of the body, a cross head mounted to move longitudinally beneath the body, a pulley on each side of the body near the free edge of the tail gate when the latter is in body closing position, a cable attached to each end of the cross head, each cable being trained over the pulley on its respective side of the body, means connecting each cable to the tail gate, power actuated means controllable from the driver's seat to move the cross head and cause the tail gate to swing about the horizontal axis into closed position, means operable by the cross head to swing the tail gate to open position, and latching hooks operable from the driver's seat for engaging the cross head and holding it in tail gate closing position.

3. The combination with a vehicle having a body which is open at its rear end, a driver's seat at the forward end of the body and a tail gate mounted at the rear end of the body to swing about a horizontal axis and close at least a part of the open rear end of the body, a cross head mounted to move longitudinally beneath the body, a pulley on each side of the body near the free edge of the tail gate when the latter is in body closing position, a cable attached to each end of the cross head, each cable being trained over the pulley on its respective side of the body, means connecting each cable to the tail gate, power actuated means controllable from the driver's seat to move the cross head and cause the tail gate to swing about the horizontal axis into closed position, yielding means carried by the body to initiate the movement of the tail gate toward open position, and latching hooks operable from the driver's seat for engaging the cross head and holding it in tail gate closing position.

4. The combination with a vehicle having a body which is open at its rear end, a driver's seat at the forward end of the body and a tail gate mounted at the rear end of the body to swing about a horizontal axis and close at least a part of the open rear end of the body, a cross head mounted to move longitudinally beneath the body, a pulley on each side of the body near the free edge of the tail gate when the latter is in body closing position, a cable attached to each end of the cross head, each cable being trained over the pulley on its respective side of the body, means connecting each cable to the tail gate, power actuated means controllable from the driver's seat to move the cross head and cause the tail gate to swing about the horizontal axis into closed position, yielding means associated with the cross head to initiate the movement of the tail gate toward closed position, and latching hooks operable from the driver's seat for engaging the cross head and holding it in tail gate closing position.

HERMON V. SHARPE.

REFERENCES CITED

The following references are of record in the file of this patent:

UNITED STATES PATENTS

| Number | Name | Date |
| --- | --- | --- |
| 1,619,504 | Gabriel | Mar. 1, 1927 |
| 1,479,398 | Ollard | Jan. 1, 1924 |
| 1,919,608 | Troell | July 25, 1933 |
| 2,286,947 | Bankson | June 16, 1942 |
| 1,983,280 | Flowers | Dec. 4, 1934 |
| 2,110,239 | Richter | Mar. 8, 1938 |
| 2,113,291 | Clark et al. | Apr. 5, 1938 |
| 2,219,256 | Evangelista | Oct. 22, 1940 |